(12) United States Patent
Kim et al.

(10) Patent No.: US 9,985,279 B2
(45) Date of Patent: May 29, 2018

(54) SILICON OXIDE-CARBON COMPOSITE, METHOD OF MANUFACTURING THE COMPOSITE, AND ENERGY STORAGE DEVICE HAVING THE COMPOSITE

(71) Applicant: Industry-Academia Cooperation Group of Sejong University, Seoul (KR)

(72) Inventors: Sun Jae Kim, Seoul (KR); Hee June Jung, Seoul (KR); Kang Seop Yun, Ansan-si (KR); Eul Noh, Goyang-si (KR)

(73) Assignee: INDUSTRY-ACADEMIA COOPERATION GROUP OF SEJONG UNIV, Seoul (KR)

( * ) Notice: Subject to any disclaimer, the term of this patent is extended or adjusted under 35 U.S.C. 154(b) by 487 days.

(21) Appl. No.: 14/618,982

(22) Filed: Feb. 10, 2015

(65) Prior Publication Data

US 2015/0228967 A1    Aug. 13, 2015

(30) Foreign Application Priority Data

Feb. 10, 2014  (KR) .................. 10-2014-0015166
Jan. 27, 2015  (KR) .................. 10-2015-0012887

(51) Int. Cl.
*H01M 4/36*      (2006.01)
*H01M 4/583*     (2010.01)
(Continued)

(52) U.S. Cl.
CPC ............ *H01M 4/364* (2013.01); *C01B 31/02* (2013.01); *H01B 1/18* (2013.01); *H01B 1/24* (2013.01);
(Continued)

(58) Field of Classification Search
CPC ...... H01M 4/364; H01M 4/386; H01M 4/483; H01M 4/485; H01M 4/58; H01M 4/587;
(Continued)

(56) References Cited

U.S. PATENT DOCUMENTS

2008/0166634 A1    7/2008  Kim et al.
2008/0261116 A1   10/2008  Burton et al.
(Continued)

FOREIGN PATENT DOCUMENTS

JP      2010-525549 A       7/2010
KR  10-2008-0064778 A       7/2008
(Continued)

OTHER PUBLICATIONS

Kim et al., "Production of Carbon Black through Decomposition of Chlorobenzene", Theories and Applications of Chem. Eng., 2005, vol. 11, No. 2, pp. 2300-2303.

*Primary Examiner* — Brittany Raymond
(74) *Attorney, Agent, or Firm* — Knobbe Martens Olson & Bear LLP

(57) ABSTRACT

Provided are a silicon oxide-carbon composite, a method of preparing the same, and an energy storage device containing the same. In the method of preparing a silicon oxide-carbon composite, a reaction solution containing an organic solvent including an aromatic compound is provided. Crystalline carbon structures are formed by generating plasma in the reaction solution. A slurry is formed by adding silicon halide and a polyol in the reaction solution in which the crystalline carbon structures are dispersed. The slurry is separated from the organic solvent and subjected to thermal treatment.

8 Claims, 8 Drawing Sheets

(51) Int. Cl.
*H01M 10/052* (2010.01)
*H01B 1/24* (2006.01)
*H01B 1/18* (2006.01)
*H01M 4/1391* (2010.01)
*H01M 4/38* (2006.01)
*H01M 4/48* (2010.01)
*H01M 4/587* (2010.01)
*C01B 31/02* (2006.01)
*H01M 4/1397* (2010.01)
*H01M 4/485* (2010.01)
*H01M 4/58* (2010.01)
*H01M 4/62* (2006.01)
*C01B 33/18* (2006.01)

(52) U.S. Cl.
CPC ......... *H01M 4/1391* (2013.01); *H01M 4/386* (2013.01); *H01M 4/483* (2013.01); *H01M 4/587* (2013.01); *C01B 33/18* (2013.01); *H01M 4/1397* (2013.01); *H01M 4/485* (2013.01); *H01M 4/58* (2013.01); *H01M 4/625* (2013.01); *H01M 10/052* (2013.01)

(58) Field of Classification Search
CPC ...... H01M 4/625; H01M 10/052; H01B 1/18; H01B 1/24
See application file for complete search history.

(56) References Cited

U.S. PATENT DOCUMENTS

2010/0143798 A1* 6/2010 Zhamu ................. H01M 4/133
429/212
2014/0120415 A1* 5/2014 Suguro ............ H01M 10/0567
429/200

FOREIGN PATENT DOCUMENTS

KR 10-2009-0034045 A 4/2009
KR 10-2015-0094503 A 8/2015

* cited by examiner

PREPARATION EXAMPLE 3

COMPARATIVE EXAMPLE 1

PREPARATION EXAMPLE 1

GC

PREPARATION EXAMPLE 3

COMPARATIVE EXAMPLE 1

PREPARATION EXAMPLE 3

COMPARATIVE EXAMPLE 1

SILICON OXIDE-CARBON COMPOSITE, METHOD OF MANUFACTURING THE COMPOSITE, AND ENERGY STORAGE DEVICE HAVING THE COMPOSITE

CROSS-REFERENCE TO RELATED APPLICATION

This application claims priority to and the benefit of Korean Patent Application No. 2014-0015166, filed on Feb. 10, 2014, and Korean Patent Application No. 2015-0012887, filed on Jan. 27, 2015, the disclosures of which are incorporated herein by reference in their entirety.

BACKGROUND

Field

The present disclosure relates to an electrochemical device, and more particularly, to an electrochemical energy storage device.

Discussion of Related Art

Lithium secondary batteries produce electrical energy due to a redox reaction occurring when lithium ions are inserted/released from a positive electrode and a negative electrode. The positive electrode and the negative electrode includes active materials capable of inserting and releasing the lithium ions, and an electrolyte solution is loaded between the positive electrode and the negative electrode.

Recently, while a carbon-based negative electrode active material such as graphite is widely used, the upper limit of theoretic capacity is limited to approximately 372 mAh/g, and thus is insufficient as a negative electrode material corresponding to a mobile digital convergence device requiring high capacity. To compensate for this defect, there is an attempt to improve theoretical capacity using a silicon-based negative electrode active material.

However, the silicon-based negative electrode active material is changed in a crystalline structure when lithium is absorbed and stored, thereby having a great change in volume of 300% or more. As integrity of components is destroyed due to such a volume change, a capacity retention ratio is considerably decreased.

SUMMARY

The present invention is directed to various aspects of a silicon oxide-carbon composite having an improved capacity retention ratio and excellent conductivity. Technical problems are not limited to those described above, and other technical problems which are not cited herein would be clearly understood to those of ordinary skill in the art.

One aspect of the invention provides a silicon oxide-carbon composite material comprising an amorphous matrix and crystalline grains kept in the matrix, wherein the amorphous matrix comprising amorphous silicon oxide and amorphous carbon, wherein the crystalline grains comprising crystalline silicon grains and crystalline carbon grains that are randomly dispersed in the amorphous matrix, wherein crystalline carbon grains comprise multilayer crystalline carbon phases. The foregoing silicon oxide-carbon composite further comprises mesopores having a dimension of 2-50 nm. In the foregoing silicon oxide-carbon composite, the total amount of the amorphous carbon and crystalline carbon grains is 60-90 wt. %. In the foregoing silicon oxide-carbon composite, Si is present more as part of Si—O—C and Si—C bonding than as $SiO_2$.

In one aspect of the present invention, a method of preparing a silicon oxide-carbon composite is provided. A reaction solution containing an organic solvent including an aromatic compound is provided. Crystalline carbon structures are formed by generating plasma in the reaction solution. A slurry is formed by adding silicon halide and a polyol in the reaction solution in which the crystalline carbon structures are dispersed. The slurry is separated from the organic solvent and then subjected to thermal treatment.

The silicon halide may be represented by Formula 1.

$$SiR^1{}_nX_{4-n} \qquad \text{[Formula 1]}$$

In Formula 1, X may be Cl, Br or I, $R^1$ may be hydrogen, methyl, ethyl or propyl, and n may be 0, 1 or 2.

The polyol may be represented by Formula 2.

$$R^2(OH)_m \qquad \text{[Formula 2]}$$

In Formula 2, $R^2$ may include an C1 to C6 alkyl group, an C6 to C18 aryl group or an C6 to C18 alkylaryl group, and m may be an integer of 2 to 4.

The polyol may include ethylene glycol, propyleneglycol (for example, 1,2-propanediol or 1,3-propanediol), butyleneglycol (for example, 1,2-butanediol, 1,3-butanediol, 1,4-butanediol, or 2,3-butanediol), pinacol, resorcinol, or bisphenol A.

A reaction between the silicon halide and the polyol in the forming of the slurry may be an exothermic reaction.

The thermal treatment may be performed at a temperature of 450 to 1000° C. In addition, the thermal treatment may be performed under an inert gas atmosphere including hydrogen.

The aromatic compound may include benzene, biphenyl, naphthalene, anthracene, or a combination of at least two thereof. The reaction solution may further contain a catalyst. The catalyst may include an organic metal compound, a sulfur-containing compound, or a combination thereof. The organic metal compound may include methallocene. The metallocene may include ferrocene, nickelocene, cobaltocene or ruthenocene. In the reaction solution, the metallocene may be contained at 1 to 10 parts by weight with respect to 100 parts by weight of the solvent. The sulfur-containing compound may include thiophene, dibenzothiophene, diphenyldisulfide, hydrogen sulfide, diallyl sulfide, allyl methyl sulfide, or a combination thereof. The sulfur-containing compound may be contained at 1 to 10 parts by weight with respect to 100 parts by weight of the solvent in the reaction solution.

In another aspect of the present invention, a silicon oxide-carbon composite is provided. The silicon oxide-carbon composite includes a matrix including amorphous silicon oxide and amorphous carbon. In the matrix, silicon metal crystals and carbon structures having a laminar graphite crystal structure are dispersed.

The amorphous silicon oxide may be $SiO_x$ (1<x<2).

The carbon structures may have a linear or curved laminar graphite crystal structure. The carbon structures may have pores therein.

The silicon oxide-carbon composite may include random-shaped microparticles having a pore.

In still aspect of the present invention, an energy storage device is provided. The energy storage device includes a first electrode including a silicon oxide-carbon composite, a second electrode, and an electrolyte disposed between the first electrode and the second electrode. The silicon oxide-carbon composite includes a matrix including an amorphous silicon oxide and an amorphous carbon. In the matrix, silicon metal crystals and carbon structures having a laminar graphite crystal structure are dispersed.

BRIEF DESCRIPTION OF THE DRAWINGS

The above and other objects, features, and advantages of the present invention will become more apparent to those of ordinary skill in the art by describing in detail embodiments thereof with reference to the adhered drawings, in which.

DETAILED DESCRIPTION OF EMBODIMENTS

Hereinafter, the embodiment of the present invention will be described in further detail with reference to the accompanying drawings. However, the present invention is not limited to the embodiments that will be described herein, and may be concreted in different types.

Method of Manufacturing Silicon Oxide-Carbon Composite

Figure 1:
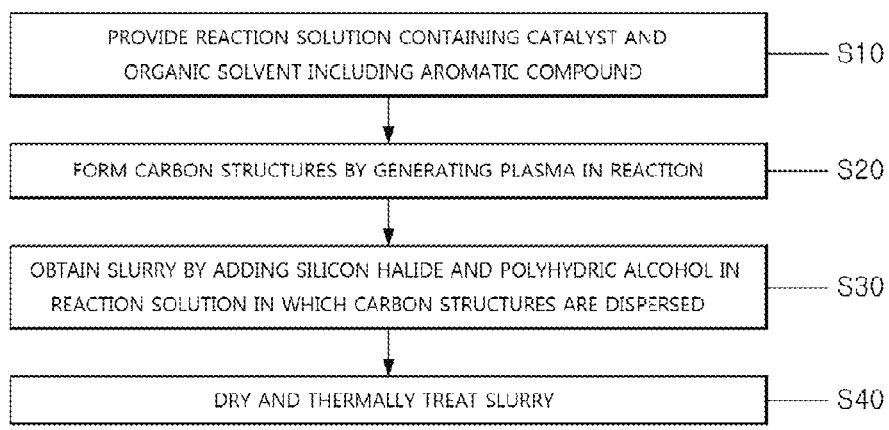
FIG. 1 is a flowchart illustrating a method of preparing a silicon oxide-carbon composite according to an embodiment of the present invention.

FIG. 1 is a flowchart illustrating a method of manufacturing a silicon oxide-carbon composite according to an embodiment of the present invention.

Referring to FIG. 1, a reaction solution containing an organic solvent including an aromatic compound is provided (S10). The organic solvent may be composed of only an aromatic compound and unavoidable impurities.

The aromatic compound may be an aromatic compound having 6 to 12 carbon atoms, and may be a carbon precursor, that is, a base material for crystalline carbon material. In one example, the aromatic compound may include non-substituted or substituted benzene, non-substituted or substituted biphenyl, non-substituted or substituted naphthalene, non-substituted or substituted anthracene, or a combination of at least two thereof. As a substituent, a hydroxyl group, a methyl group, or a nitro group may be used. As an example, the substituted benzene may include toluene, xylene or nitrobenzene.

The reaction solution may further contain a catalyst. The catalyst may include an organic metal compound, a sulfur-containing compound or a combination thereof. When the organic metal compound and the sulfur-containing compound are used together, the organic metal compound may be a catalyst, and the sulfur-containing compound may be a cocatalyst.

The organic metal compound may be at least one type of metallocene. In one example, the metallocene may be ferrocene, nickelocene, cobaltocene, or ruthenocene, which includes a transition metal such as Fe, Ni, Co or Ru. The organic metal compound in the reaction solution may be contained at 1 to 10 parts by weight, and particularly, 2 to 10 parts by weight or 5 to 10 parts by weight with respect to 100 parts by weight of the solvent in consideration of crystallinity and economic feasibility.

The sulfur-containing compound may include thiophene, dibenzothiophene, diphenyldisulfide, hydrogen sulfide, diallyl sulfide, allyl methyl sulfide, or a combination thereof. The sulfur-containing compound may be contained at 1 to 10 parts by weight, and particularly 2 to 10 parts by weightor 5 to 10 parts by weight with respect to 100 parts by weight of the solvent in the reaction solution.

Subsequently, a crystalline carbon structure may be obtained by generating plasma in the reaction solution (S20). While plasma is generated in the reaction solution, the reaction solution may be stirred to be mixed well.

Particularly, plasma may be generated by immersing a plasma-generating electrode and a ground electrode into the reaction solution and applying a high voltage between the two electrodes to discharge. Here, a carbon structure may be produced by a redox reaction of the aromatic compound in the reaction solution. Conditions for generating the plasma may be applying a voltage of 660 to 8250 V at a frequency of 1 to 100 kHz, specifically, 3 to 70 kHz, and a pulse width of 1 to 10 µs. As the frequency and voltage are increased, plasma intensity may be increased and a reaction rate may be increased. Accordingly, an output of the carbon structure may be adjusted by adjusting a frequency, a voltage and a discharging time.

In addition, in the plasma generating operation, the reaction solution may not be cooled. In other words, in the plasma generating operation, a temperature of the reaction solution may be maintained near the boiling point of the aromatic compound. In this case, catalytic activity may be increased, and thus crystallinity of the carbon structure may also be improved.

In the plasma generating operation, the organic metal compound may serve as a catalyst such that the carbon structure has a multilayer crystalline phase like graphite in which graphene layers are laminated, or a linear crystalline phase in which multilayer graphene layers are linearly extended. In other words, when a catalyst is contained in the reaction solution, the carbon structure partially or entirely has a laminar or layered graphite crystalline structure, which may have a linear type. Particularly, when the organic metal compound is contained at 2 parts by weight or more with respect to 100 parts by weight of the solvent in the reaction solution, such a linear crystalline phase may predominantly appear in the carbon structure.

Meanwhile, when a catalyst is not included in the reaction solution, the carbon structure may at least partially or entirely have a curved laminar or layered graphite crystalline structure.

In addition, the sulfur-containing compound may serve as a cocatalyst helping the organic metal compound, and when such a sulfur-containing compound is included at 5 parts by weight or more, for example, 6 parts by weight or more, 7 parts by weight or more, 8 parts by weight or more, 9 parts by weight or more or 10 parts by weight or more, with respect to 100 parts by weight of the solvent, a mesopore may be formed in the carbon structure. Such a mesopore is a pore having a diameter of 2 to 50 nm, particularly, 2 to 20 nm, and the carbon structure having the mesopore may be used in various electrochemical devices, particularly, an energy storage device.

Likewise, Korean Patent Application No. 2014-0195500 relating to forming the carbon structure may be incorporated herein in its entirety.

A slurry may be formed by adding silicon halide and a polyol in the reaction solution in which the crystalline carbon structures are dispersed (S30). Particularly, a slurry may be formed by adding silicon halide to the reaction solution to disperse, and adding a polyol to the resulting product to react with the silicon halide.

Here, the polyol may be slowly added. For example, the polyol may be added to the reaction solution in which the silicon halide is dispersed with a small amount several times by, for example, dripping. Accordingly, the reaction rate of the silicon halide and the polyol may be adjusted, and generation of a byproduct may be reduced.

The silicon halide may be represented by the following Formula.

$$SiR^1_nX_{4-n}$$ [Formula 1]

In Formula 1, X may be Cl, Br or I, $R^1$ may be hydrogen, methyl, ethyl or propyl, and n may be 0, 1 or 2. When n is 2, two $R^1$ may be equal to or different from each other. The silicon halide may be, for example, $SiCl_4$.

Here, the silicon halide may be mixed at a volume ratio of 30 to 50 ml per 100 ml of the organic solvent in which the carbon structure is dispersed in consideration of a silicon content and a carbon content in a final product.

The polyol may be a compound having at least two hydroxyl groups represented by Formula 2.

$$R^2(OH)_m$$ [Formula 2]

In Formula 2, $R^2$ may be a C1 to C6 alkyl group, a C6 to C18 aryl group or a C6 to C18 alkylaryl group, and m may be an integer of 2 to 4.

The polyol may include, for example, diol (m=2), triol (m=3), or tetrol (m=4). The diol may include, for example, ethyleneglycol, propyleneglycol (for example, 1,2-propanediol or 1,3-propanediol), butyleneglycol (for example, 1,2-butanediol, 1,3-butanediol, 1,4-butanediol or 2,3-butanediol), pinacol, resorcinol, or bisphenol A. The triol may include, for example, glycerol or benzene triol.

The polyol may be mixed at a volume ratio of 20 to 30 ml per 100 ml of the organic solvent in which the carbon structure is dispersed.

In the reaction solution, the silicon halide and the polyol may be formed in a network structure by the following reaction scheme, and may become a slurry or a gel.

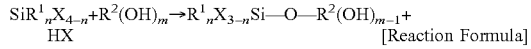

$$SiR^1_nX_{4-n}+R^2(OH)_m \rightarrow R^1_nX_{3-n}Si-O-R^2(OH)_{m-1}+HX$$ [Reaction Formula]

In Reaction Formula, X, $R^1$, and n are the same as defined in Formula 1, and $R^2$ and m are the same as defined in Formula 2.

The reaction may be performed at room temperature, and an exothermic reaction.

Hereinafter, the slurry is separated from the organic solvent and dried to remove the solvent, and then subjected to thermal treatment (S40). In the drying operation, gel powder may be obtained, and the gel powder may be black. In addition, through the thermal treatment, a silicon oxide-carbon composite may be obtained. Particularly, in the thermal treating operation, a part of carbons originating from the polyol is removed from the silicon oxide in the form of carbon dioxide or hydrocarbon, and thus a pore may be formed. In addition, in the thermal treating operation, crystallinity of the carbon structures may be further improved.

The thermal treatment may be performed at a temperature of 450 to 1000° C., and preferably 550 to 1000° C. in a vacuum and/or under an inert gas atmosphere or a reducing atmosphere. As an example, the thermal treatment may be performed under an inert gas atmosphere including hydrogen. However, when the thermal treatment is performed in a vacuum, a composite having improved porosity may be obtained.

Silicon Oxide-Carbon Composite

Figure 2:
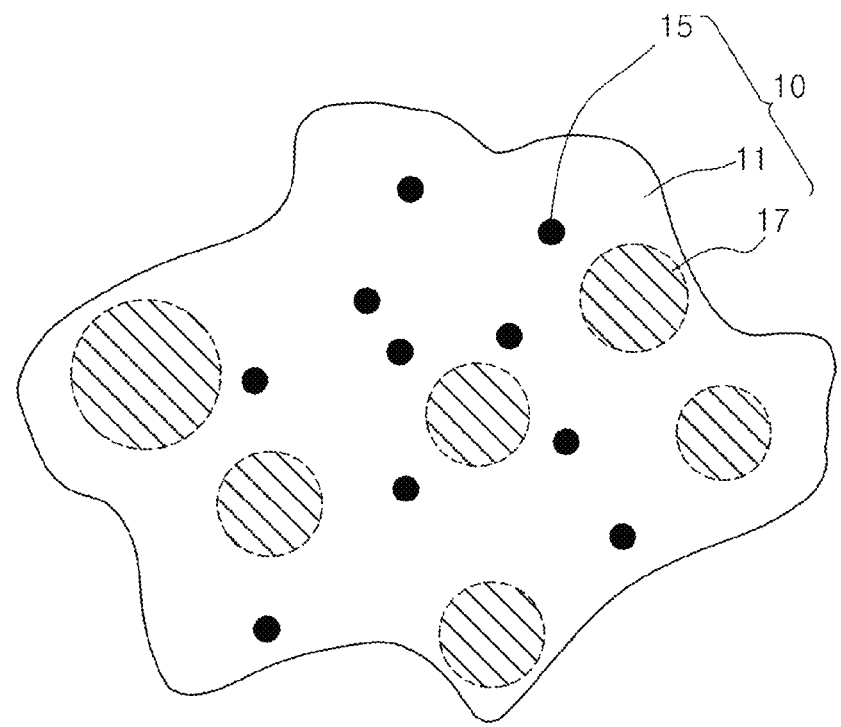
FIG. 2 is an example of a silicon oxide-carbon composite according to an embodiment of the present invention.

FIG. 2 is a conceptual illustration of a silicon oxide-carbon composite according to an embodiment of the present invention. The silicon oxide-carbon composite material 10 has random shapes with a dimension of several to several hundreds of micrometers, for example, a diameter of 1 to 10 µm. The microparticles may include internal pores.

As illustrated in FIG. 2, the silicon oxide-carbon composite 10 has a matrix including comprising amorphous silicon oxide and amorphous carbon, in which crystalline silicon grains 15 and crystalline carbon grains (or carbon structures) 17 are randomly dispersed. In embodiments, the crystalline carbon grains include laminated structures identified as GC in FIG. 7.

When used as an active material of an energy storage device such as batteries, the silicon oxide-carbon composite 10 in which a silicon-based material and a carbon-based material are randomly dispersed may inhibit volume expansion of the silicon-based material which lithium or sodium is inserted into and released from. In addition, the carbon structures 17 having highly conductive laminar crystalline carbon structure may add electrical conductivity to the material and compensate loss of conductivity caused by inclusion of the silicon-based material.

In addition, in the silicon oxide-carbon composite 10, the amorphous silicon oxide may be represented as SiOx, in which x may be in a range of approximately 0<x<2, approximately 1<x<2, approximately 1.5<x<2, approximately 1.7<x<2, approximately 1.5<x<1.8, or 1.7<x<1.8. In the silicon oxide-carbon composite 10, contents of the amorphous carbon and crystalline carbon structures 17 may be approximately 50 to approximately 90 at %, approximately 60 to approximately 90 at %, approximately 60 to approximately 85 at %, approximately 70 to approximately 90 at %, approximately 70 to approximately 85 at %, or approximately 75 to approximately 85 at %.

The crystalline carbon structures 17 may include at least some multilayer crystalline phases in which graphene layers are laminated. The multilayer crystalline phases may include curved crystalline phases in which graphene layers are disposed in curved or bent. The multilayer crystalline phases may also include linear crystalline phases in which graphene layers are extended in a straight line. In some embodiments, the crystalline carbon structures 17 may include multilayer crystalline phases of curved phases and/or linear phases. In other words, the crystalline carbon structures 17 may have at least partially or entirely a laminar graphite crystalline structure, and the laminar graphite crystalline structure may be a curved or linear shape. Linear crystalline phases have higher electric conductivity than curved phases. The crystalline carbon structures 17 may have several linear crystalline groups therein, and directions of the linear crystalline groups may be different from each other. Here, the linear crystalline group may refer to a unit group in which crystal surfaces, that is, graphene layers are laminated in parallel with each other, and the direction of the linear crystalline group may refer to a direction of an extended crystalline surface.

Furthermore, the crystalline carbon structures 17 may include multiple pores therein. Such a pore may be a mesopore, that is, a pore having a size of 2 to 50 nm, and particularly, a diameter of 2 to 20 nm.

Energy Storage Device

Figure 3:
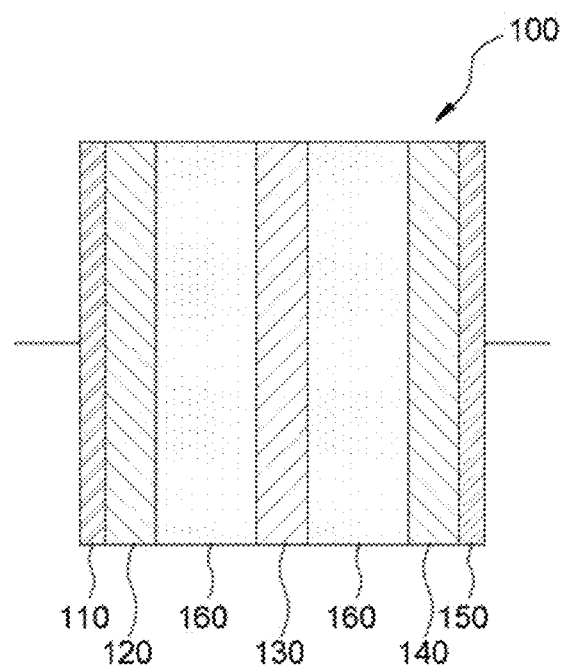
FIG. 3 is a schematic diagram of an energy storage device according to an embodiment of the present invention.

FIG. 3 is a schematic diagram of an energy storage device according to an embodiment of the present invention.

In the embodiment, the energy storage device may be an electrochemical capacitor or a secondary battery as an electrochemical energy storage device. The electrochemical capacitor may be a supercapacitor or a lithium ion capacitor. The secondary battery may be a lithium secondary battery, a sodium secondary battery, or a lithium-air battery. However, the present invention is not limited thereto.

Referring to FIG. 3, the energy storage device includes a negative electrode active material layer 120, a positive electrode active material layer 140, and a separation film 130 interposed therebetween. An electrolyte 160 may be disposed or loaded between the negative electrode active material layer 120 and the separation film 130 and between the positive electrode active material layer 140 and the separation film 130. The negative electrode active material layer 120 may be disposed on a negative electrode current collector 110, and the positive electrode active material layer 140 may be disposed on a positive electrode current collector 150.

The separation film 130 may be an insulating porous structure, and may be a film laminate containing polyethylene or polypropylene or a non-woven fabric containing cellulose, polyester, or polypropylene.

The electrolyte 160 may be an aqueous or non-aqueous electrolyte solution, but to increase an operating voltage of the device, a non-aqueous electrolyte solution may be used. However, the present invention is not limited thereto, and the electrolyte 160 may be a solid electrolyte. The non-aqueous electrolyte solution may include an electrolyte and a medium, and the electrolyte may be a lithium salt, a copper salt or an ammonium salt. The lithium salt may include lithium perchlorate ($LiClO_4$), lithium tetrafluoroborate ($LiBF_4$), lithiumhexafluorophosphate ($LiPF_6$), lithium trifluoromethane sulfonate ($LiCF_3SO_3$), lithium hexafluoroarcenate ($LiAsF_6$), or lithium trifluoromethanesulfonyl imide ($Li(CF_3SO_2)_2N$). The copper salt may include copper (I) thiocyanate or copper (II) triflate. The ammonium salt may include tetraethylammonium tetrafluoroborate ($TEABF_4$), triethylmonomethylammonium tetrafluoroborate, tetraethylammonium hexafluorophosphate, or an N, N-diethyl-N-methyl-N-(2-methoxyethyl)ammonium (DEME) salt. The medium may include ethylenecarbonate, propylenecarbonate. dimethylcarbonate, methylethylcarbonate, diethylcarbonate, acrylonitrile, or γ-caprolactone.

The negative electrode active material layer 120 may include a silicon oxide-carbon composite 10 (of FIG. 2) described with reference to FIG. 2. In this case, the silicon oxide-carbon composite 10 in which silicon-based materials and carbon-based materials are randomly dispersed may inhibit expansion of a volume of the silicon-based material when lithium or sodium is inserted into the silicon-based material or released. In addition, crystalline carbon structures having a laminar graphite crystal structure 17 (in FIG. 2) may sufficiently compensate for a little low conductivity caused by the silicon-based material due to excellent crystallinity. Moreover, when the crystalline carbon structures 17 have a linear laminar graphite crystalline structure, conductivity may be further improved.

In one example, the silicon oxide-carbon composite 10 (in FIG. 2) may be mixed with a polymer binder, a conductor and a solvent to make a slurry, and the slurry may be coated on the negative electrode current collector 110 and dried, thereby forming the negative electrode active material layer 120.

The negative electrode current collector may be a metal having thermal resistance, and include, for example, iron, copper, aluminum, nickel, stainless steel, titanium, tantalum, gold or platinum. In one embodiment, the negative electrode current collector may be copper or stainless steel. A top surface of the negative electrode current collector may be roughened to improve an adhesive strength to the negative electrode active material layer 120.

Meanwhile, a positive electrode may be formed by coating the positive electrode current collector 150 with the slurry made by mixing the positive electrode active material, the polymer binder and the solvent. The positive electrode active material may contain a composite oxide having lithium and at least one of cobalt, manganese, nickel, iron, a combination thereof, or a composite phosphate having lithium and at least one of cobalt, manganese, nickel, iron, a combination thereof. For example, the positive electrode active material may include $LiCoO_2$, $LiNiO_2$, $Li(Co_xNi_{1-x})O_2(0.5 \leq x<1)$, $LiMn_2O_4$, $LiMn_5O_{12}$, or $Li_{1+x}(Ni_{1-y-z}Co_yMn_z)_{1-x}O_2$ ($0 \leq x \leq 0.2$, $0.1 \leq y \leq 0.5$, $0.1 \leq z \leq 0.5$, $0<y+z<1$).

Polymer binders used to form the negative electrode active material layer and the positive electrode active material layer may independently include, for example, a fluorine resin such as polyvinylidenechloride, polytetrafluoroethylene, tetrafluoroethylene, a vinylidenefluoride-based copolymer, or hexafluoropropylene; a polyolefin resin such as polyethylene, polypropylene; or a cellulose such as carboxymethyl cellulose. The solvent used to form the negative electrode active material layer and the positive electrode active material layer may be an organic solvent, and for example, may include an amine-based solvent such as N,N-dimethylaminopropylamine, diethyltriamine; an ether-based solvent such as ethyleneoxide, tetrahydrofurane; a ketone-based solvent such as methylethylketone; an ester-based solvent such as methyl acetate; or an aprotic polar solvent such as dimethylacetamide or N-methyl-2-pyrrolidone.

The positive electrode current collector 150 may be a metal having thermal resistance, and include, for example, iron, copper, aluminum, nickel, stainless steel, titanium, tantalum, gold or platinum. In one embodiment, the positive electrode current collector may be aluminum or stainless steel. A top surface of the positive electrode current collector 150 may also be roughened to improve an adhesive strength to the positive electrode active material layer 140.

Hereinafter, examples will be provided to help in understanding the present invention. However, the following examples are merely provided to help in understanding the present invention, but the present invention is not limited by the following examples.

Preparation Example 1: Preparation of Silicon Oxide-Carbon Composite 355 g of a solvent, that is, benzene, was prepared as a reaction solution. Then, plasma was generated in the reaction solution. As an electrode for generating plasma, a tungsten rod material having a diameter of 2.6 mm is used, and a distance between electrodes was maintained at 0.5 mm using a thickness gauge. To generate the plasma, a power supply was generated at a frequency, a pulse width and a voltage of 30 kHz, 5 µs, and 8250 V, respectively. To uniformly maintain concentration distribution in the reaction solution during the generating of the plasma, stirring was performed, and the solution was not cooled. According to the progress of the plasma generating operation, a color of the benzene was drastically changed to black in the reaction solution, and black carbon structures were synthesized.

40 ml of silicon perchloride ($SiCl_4$, 99%, Wako Co.) was added into 100 ml of the reaction solution in which the carbon structures were dispersed and stirring was performed to make a mixed solution. 26 ml of ethyleneglycol (99.9%, Samchun Co.) was dripped into the mixed solution using a pipette, and the mixed solution was stirred to slowly mix ethyleneglycol in the mixture of the non-polar solvent, benzene, and the silicon perchloride, thereby obtaining a slurry.

The slurry was dried at room temperature, and injected into a vertical tube furnace, and thermally treated in a vacuum atmosphere at 725° C. for 1 hour, thereby obtaining a silicon oxide-carbon composite in the form of porous fine powder.

Preparation Example 2: Preparation of Silicon Oxide-Carbon Composite

A silicon oxide-carbon composite was prepared by the same method as described in Preparation Example 1, except that 5 parts by weight (17.75 g) of ferrocene as a catalyst was mixed to 100 parts by weight (355 g) of benzene as a solvent to prepare a reaction solution.

Preparation Example 3: Preparation of Silicon Oxide-Carbon Composite

A silicon oxide-carbon composite was prepared by the same method as described in Preparation Example 1, except that 5 parts by weight (17.75 g) of ferrocene as a catalyst and 5 parts by weight (17.75 g) of thiopene were mixed to 100 parts by weight (355 g) of benzene as a solvent to prepare a reaction solution.

Comparative Example 1: Preparation of Silicon Oxide

A slurry was obtained by mixing 40 ml of silicon perchloride ($SiCl_4$, 99%) and 26 ml of ethylene glycol, and stirring the mixed solution. The slurry was dried at room temperature, injected into a vertical tube furnace maintained in a vacuum atmosphere, and thermally treating the slurry at 725° C. for 1 hour, thereby obtaining silicon oxide in the form of porous fine powder.

Figure 4:
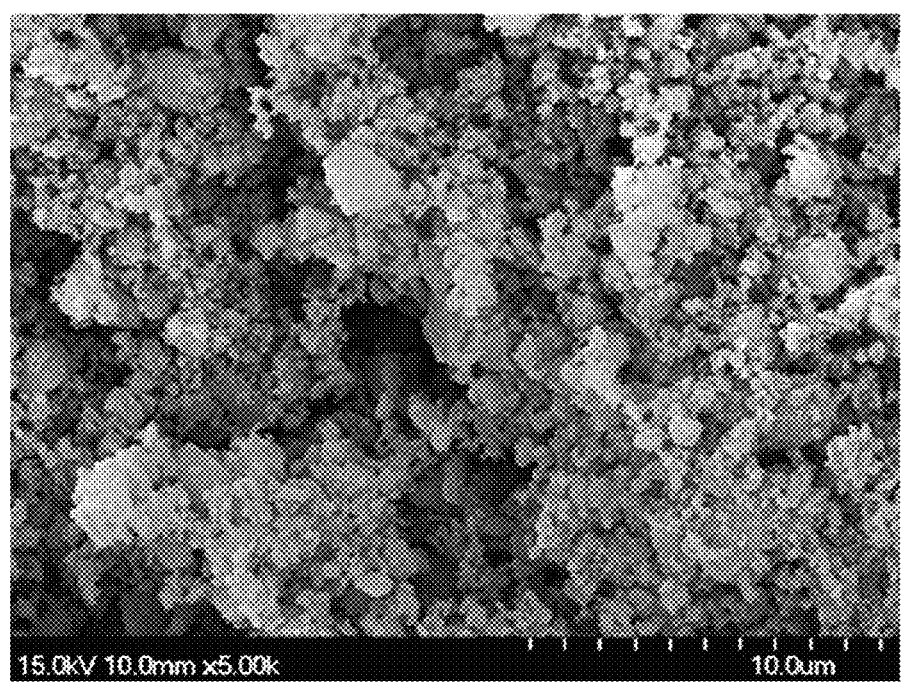
FIGS. 4 and 5 are scanning electron microscope (SEM) images of powders according to Preparation Example 3 and Comparative Example 1, respectively.
Figure 5:
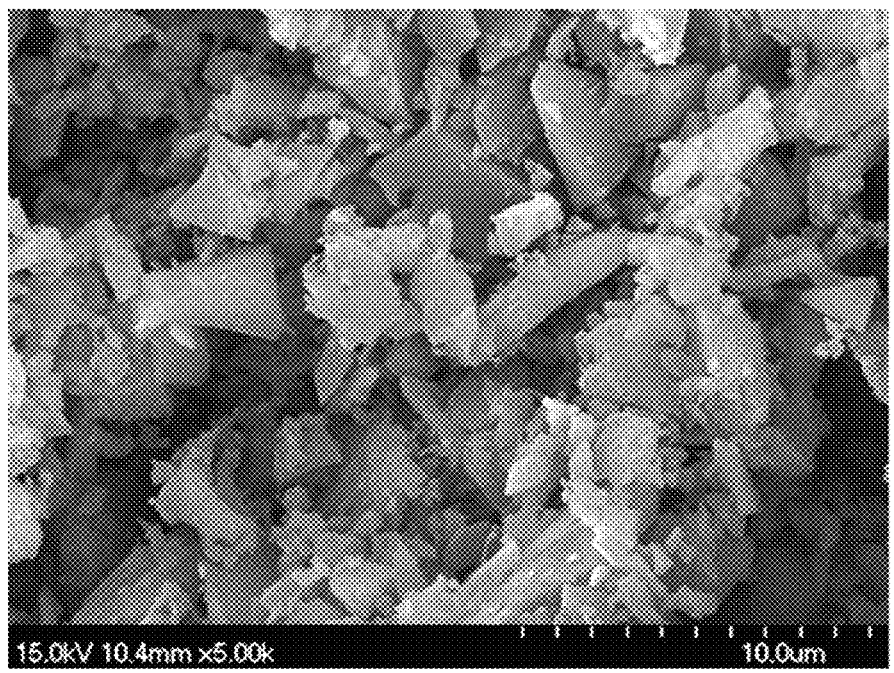

FIGS. 4 and 5 are SEM images of the powders according to Preparation Example 3 and Comparative Example 1, respectively.

Referring to FIGS. 4 and 5, it can be confirmed that the silicon oxide-carbon composite according to Preparation Example 3 (FIG. 4) is random-shaped particles having a size of approximately 1 to 7 µm. It can also be seen that the silicon oxide particles according to Comparative Example 1 (FIG. 5) have random shapes.

Figure 6:
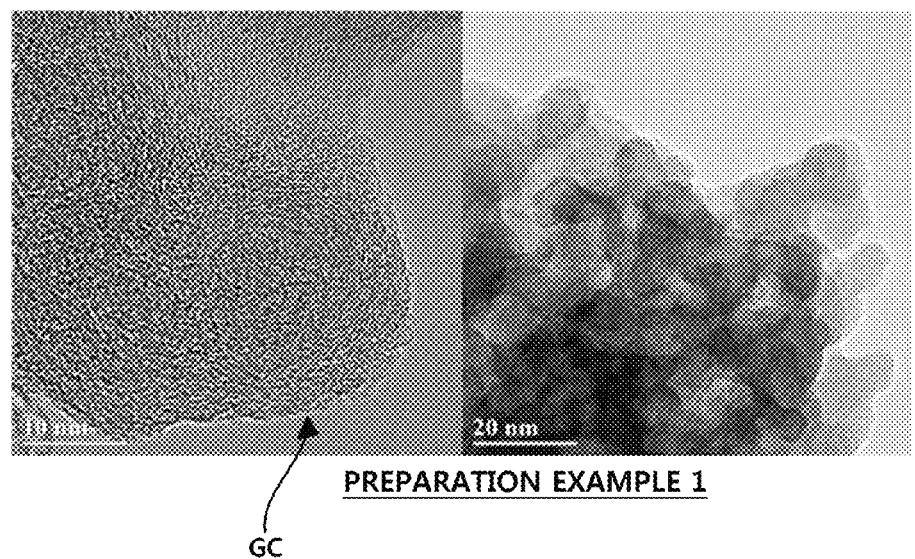
FIGS. 6 to 8 are transmission electron microscope (TEM) images of powders according to Preparation Examples 1 and 3, and Comparative Example 1, respectively.
Figure 7:
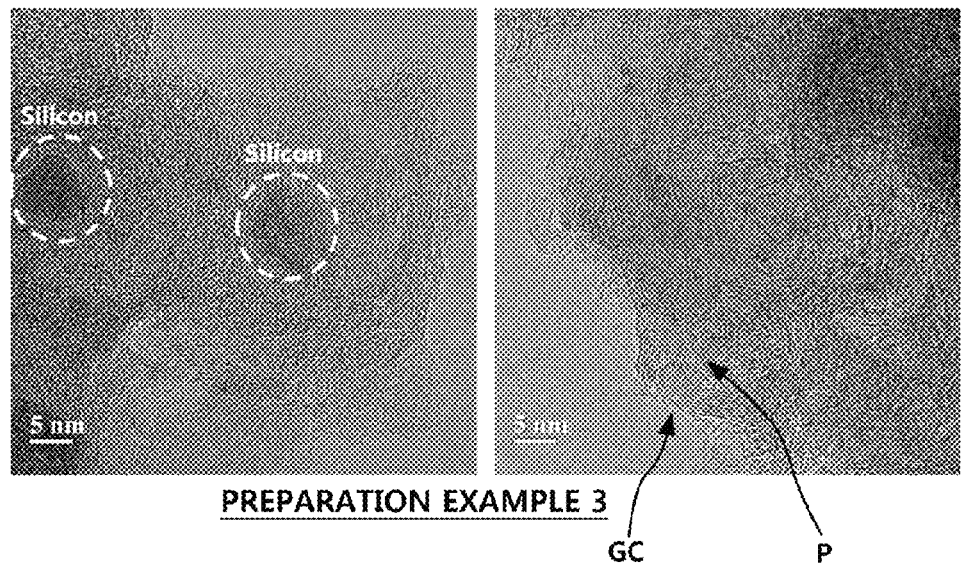
Figure 8:
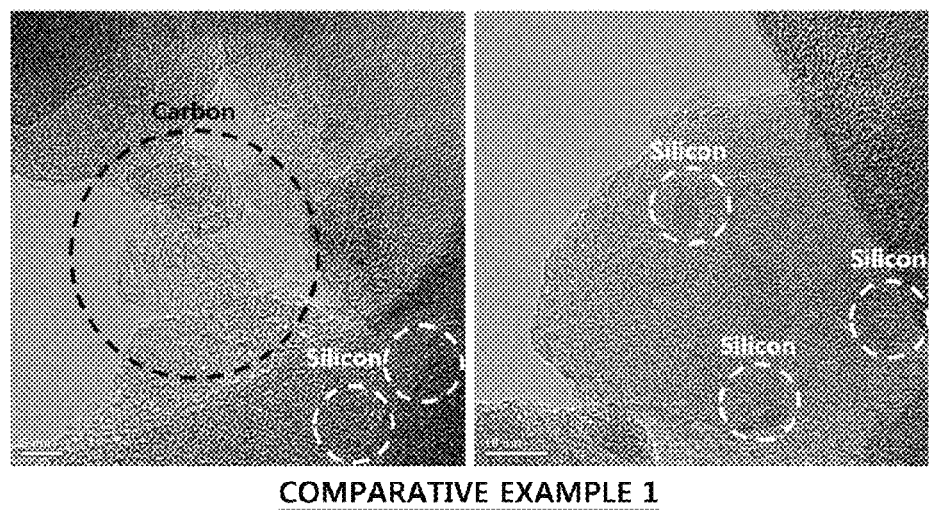

FIGS. 6 to 8 are TEM images of the powders according to Preparation Examples 1 and 3, and Comparative Example 1, respectively.

Referring to FIGS. 6 to 8, it can be seen that the silicon oxide particles according to Comparative Example 1 and the silicon oxide-carbon composites according to Preparation Examples 1 and 3 include dispersed silicon metal crystals (or particles) and carbon structures, that is, carbon crystals (or particles), and it was estimated that other regions would be amorphous silicon oxide ($SiO_x$) and amorphous carbon since crystallinity was not observed. In other words, it can be understood that silicon metal crystals and carbon crystals are dispersed in a matrix including (or composed of) amorphous silicon oxide and amorphous carbon in the silicon oxide according to Comparative Example 1 and the silicon oxide-carbon composites according to Preparation Examples 1 and 3.

It was estimated that a carbon component including carbon crystals and amorphous carbon in the silicon oxide particle according to Comparative Example 1 is derived from ethylene glycol.

Meanwhile, it can be seen that the carbon crystals does not have an apparent laminar graphite crystal structure in the silicon oxide particle according to Comparative Example 1 (FIG. 8), and the carbon crystals have an apparent laminar graphite crystal structure (GC) in the silicon oxide-carbon composites according to Preparation Examples 1 and 3 (FIGS. 6 and 7). Accordingly, it can be seen that the silicon oxide-carbon composites according to Preparation Examples 1 and 3 include the carbon crystals having more excellent crystallinity than the silicon oxide particles according to Comparative Example 1. Therefore, it can be seen that the silicon oxide-carbon composites according to Preparation Examples 1 and 3 has a higher electric conductivity than the silicon oxide particles according to Comparative Example 1.

Moreover, it can be seen that in the silicon oxide-carbon composites according to Preparation Example 1, the laminar graphite crystal structure (GC) of the carbon crystals are a little curved, but in the silicon oxide-carbon composites according to Preparation Example 3, the laminar graphite crystal structure (GC) of the carbon crystals are more linear. The carbon crystals having the linear laminar graphite crystal structure may have a higher electric conductivity than the curved ones. It can also be observed that mesopores (P) having a diameter of approximately 2 to 50 nm are formed between the linear laminar graphite crystal structure (GC) in the silicon oxide-carbon composite according to Preparation Example 3.

Figure 9:
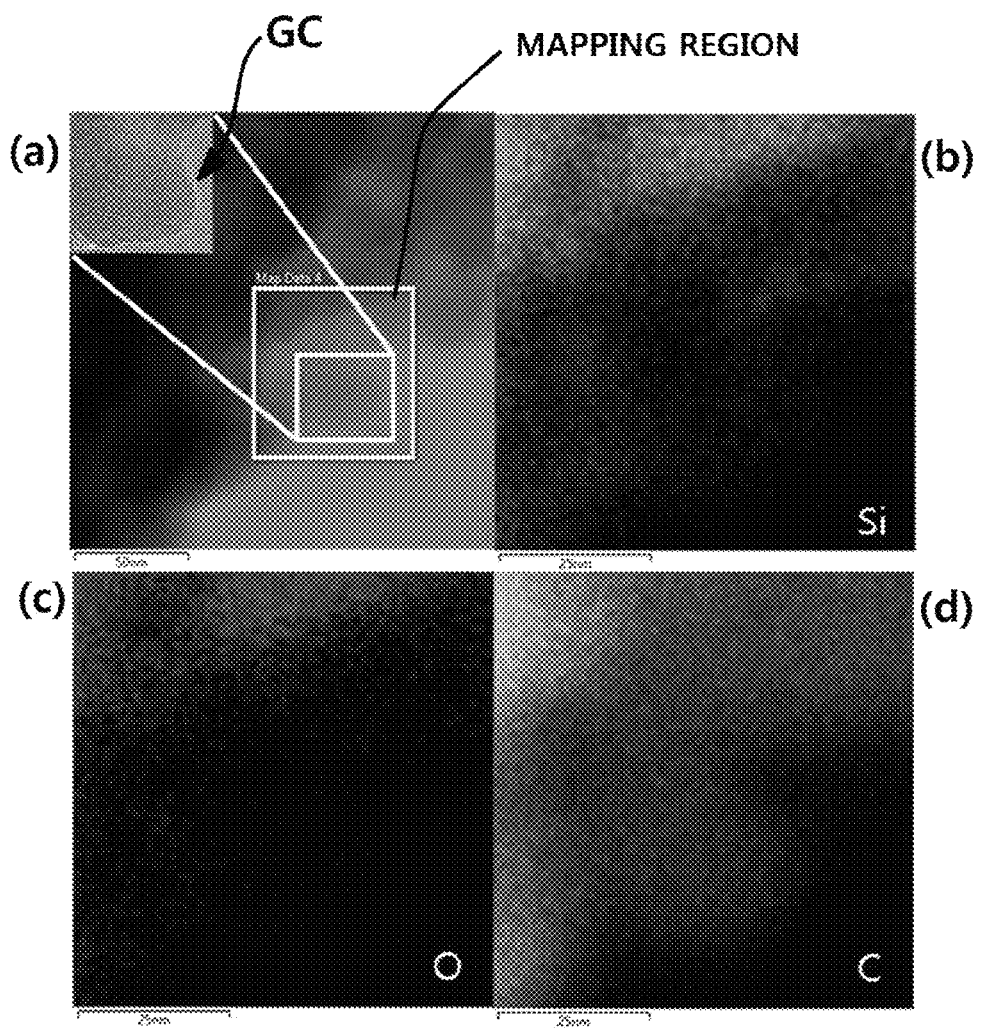
FIG. 9 shows a TEM image (a) and energy dispersive spectroscopy (EDS) mapping images (b, c and d) of the powers according to Preparation Example 1.
Figure 10:
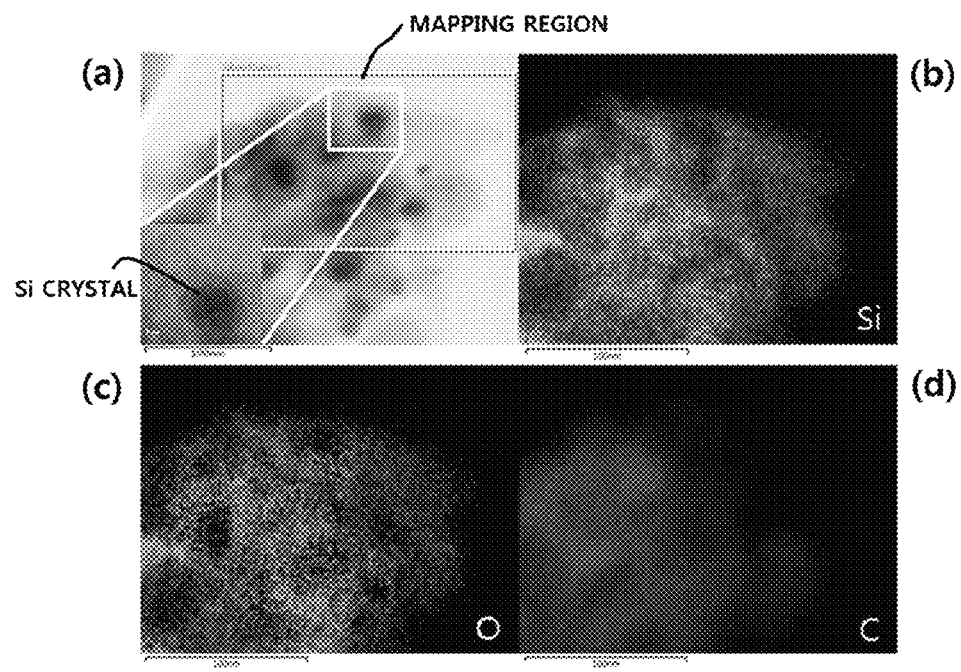
FIG. 10 is a TEM image (a) and EDS mapping images (b, c and d) of the powers according to Preparation Example 3.

FIG. 9 shows a TEM image (a) and energy dispersive spectroscopy (EDS) mapping images (b, c and d) of the powers according to Preparation Example 1, and FIG. 10 is a TEM image (a) and EDS mapping images (b, c and d) of the powers according to Preparation Example 3.

Referring to FIGS. 9 and 10, in addition to a region in which carbon crystals having a laminar graphite crystal structure (GC) (refer to (a)) are seen, carbon (refer to (d)), silicon (refer to (b)), and oxygen (refer to (c)) are identified (FIG. 9). In addition, in addition to a region in which silicon metal crystals are seen (refer to (a)), carbon (refer to (d)), silicon (refer to (b)), and oxygen (refer to (c)) are identified (FIG. 10). From such results, it can be estimated that, in the silicon oxide-carbon composites in Preparation Examples 1 and 3, silicon metal crystals and carbon crystals or carbon structures having a laminar graphite crystal structure are dispersed in the matrix including (or composed of) amorphous silicon oxide and amorphous carbon.

Meanwhile, according to TEM-EDS componential analysis for the powers according to Preparation Example 3 and Comparative Example 1, the silicon oxide-carbon composite according to Preparation Example 3 includes carbon at a content of approximately 80.76 at %, and in the amorphous silicon oxide, that is, $SiO_x$, x is 1.71, and the silicon oxide powder according to Comparative Example 1 includes carbon at a content of approximately 52 at %, and in the amorphous silicon oxide, that is, $SiO_x$, x is 1.66.

Figure 11:
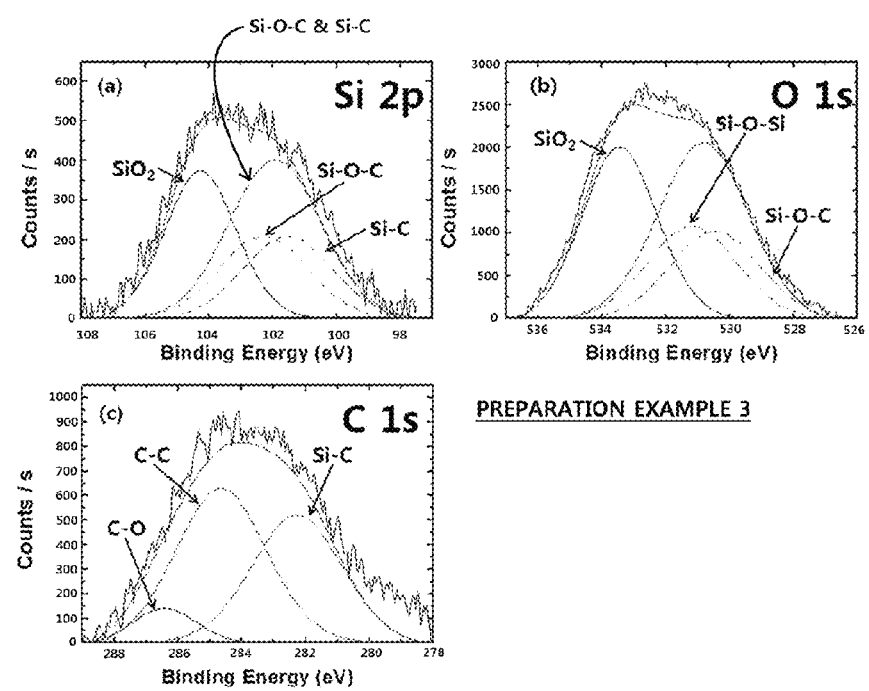
FIGS. 11 and 12 are graphs showing a result obtained by X-ray photoelectron spectroscopy for powders according to Preparation Example 3 and Comparative Example 1, respectively.
Figure 12:
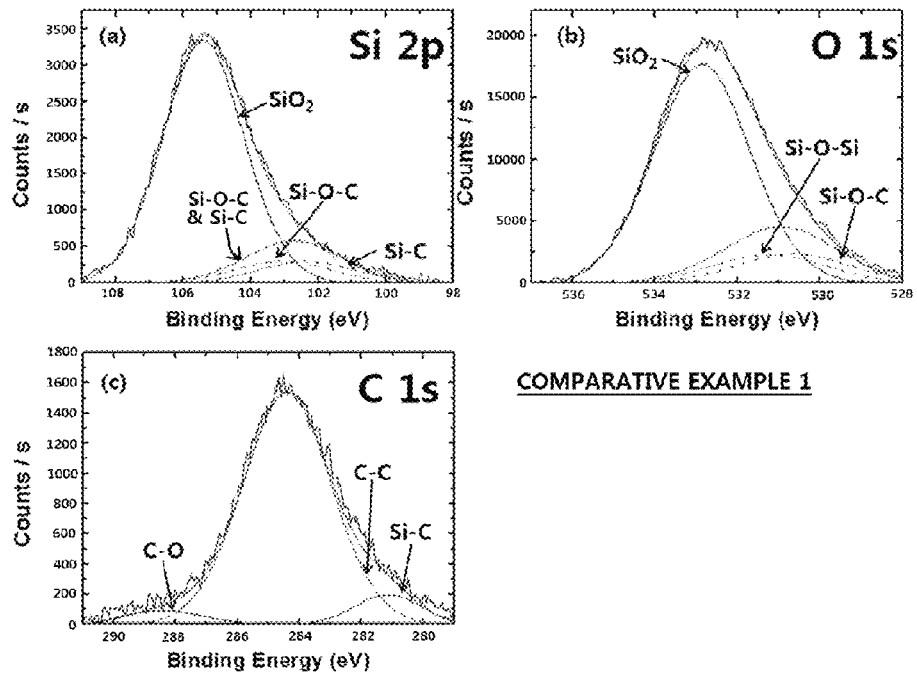

FIGS. 11 and 12 are graphs showing results of X-ray photoelectron spectroscopy for the powders according to Preparation Example 3 and Comparative Example 1, respectively.

Referring to FIGS. 11 and 12, it can be seen that the silicon oxide according to Comparative Example 1 and the silicon oxide-carbon composite according to Preparation Example 3 are basically based on $SiO_2$, and have chemical bonds of Si—O—C, Si—C, C—C, and C—O. However, it can be seen that the silicon oxide-carbon composite according to Preparation Example 3 has higher ratios of the chemical bonds, Si—O—C, Si—C, and C—O, between carbon and silicon oxide than the silicon oxide according to Comparative Example 1. Accordingly, it can be expected that the silicon oxide-carbon composite according to Preparation Example 3 has increased chemical bonds between the carbon and the silicon oxide, compared to the silicon oxide according to Comparative Example 1.

Furthermore, it can be seen that, in the silicon oxide according to Comparative Example 1, a combined intensity of a peak representing the Si—O—C bond and a peak representing the Si—C bond is very lower than an intensity of a peak representing the $SiO_2$ bond. Meanwhile, it can be seen that, in the silicon oxide-carbon composite according to Preparation Example 3, an intensity of peaks including a peak representing the Si—O—C bond and a peak representing the Si—C bond is higher than an intensity of a peak representing the $SiO_2$ bond. In other words, it can be seen that a ratio of the intensity of the peaks including the peak representing the Si—O—C bond and the peak representing the Si—C bond with respect to the intensity of the peak representing the $SiO_2$ bond exceeds 1. From the result, it can be seen that the silicon oxide-carbon composite according to Preparation Example 3 is a material based on the Si—O—C bond and the Si—C bond in addition to the $SiO_2$ bond. In contrast, it can be seen that the silicon oxide according to Comparative Example 1 is a material mainly based on the $SiO_2$ bond.

Preparation Example 4: Preparation Example of Lithium Secondary Battery

A negative electrode was formed by mixing 70 wt % of silicon oxide-carbon composite powder prepared in Preparation Example 3, 20 wt % of a conductor (super-p), and 10 wt % of a binder, carboxymethyl cellulose (CMC), in distilled water, and coating the mixed result on a copper current collector to a thickness of 120 μm using doctor blading. Afterward, a battery was manufactured using a metal lithium as a positive electrode, and a non-aqueous electrolyte solution containing 1M $LiPF_6$ as an electrolyte, and ethylenecarbonate and dimethylcarbonate (weight ratio=3:7) as an organic solvent.

Preparation Example 5: Preparation Example of Lithium Secondary Battery

A battery was manufactured by the same method as described in Preparation Example 4, except that a negative electrode was coated to a thickness of approximately 50 μm.

Comparative Example 2: Manufacture of Lithium Secondary Battery

A lithium secondary battery was manufactured by the same method as described in Preparation Example 4, except that the silicon oxide prepared in Comparative Example 1 was used instead of the silicon oxide-carbon composite prepared in Preparation Example 3.

Figure 13:
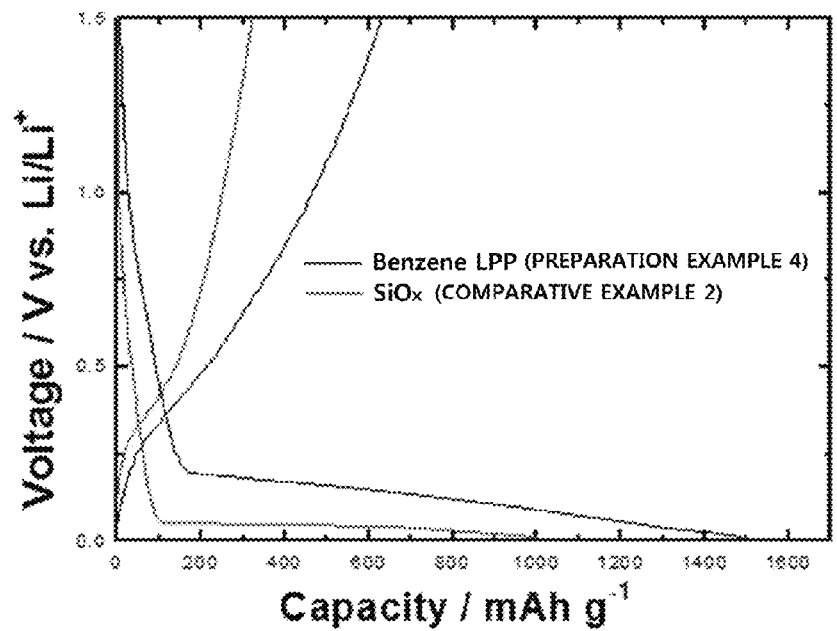
FIG. 13 is a graph showing charge/discharge characteristics of lithium secondary batteries according to Preparation Example 4 and Comparative Example 2.

FIG. 13 is a graph showing charge/discharge characteristics of the lithium secondary batteries according to Preparation Example 4 and Comparative Example 2, respectively. Here, charging was performed in constant current charge to 1.5V at 0.02 c-rate, and discharging was performed in constant current discharge to 0.01 V at the same rate as the charge rate. The charge/discharge characteristics at the first cycle are shown in the graph.

Referring to FIG. 13, when the lithium secondary battery according to Comparative Example 2, that is, the silicon oxide according to Comparative Example 1, is used as a negative electrode active material, it can be seen that a charge capacity is approximately 1000 mAh/g, and a discharge capacity is approximately 321 mAh/g. Meanwhile, when the lithium secondary battery according to Preparation Example 4, that is, the silicon oxide-carbon composite according to Preparation Example 3, is used as a negative electrode active material, it can be seen that a charge capacity is approximately 1500 mAh/g, and a discharge capacity is approximately 630 mAh/g.

Likewise, compared to when the silicon oxide is used as a negative electrode active material, when the silicon oxide-carbon composite is used as a negative electrode active material, it can be seen that the charge/discharge capacities of the lithium secondary battery are considerably improved.

Figure 14:
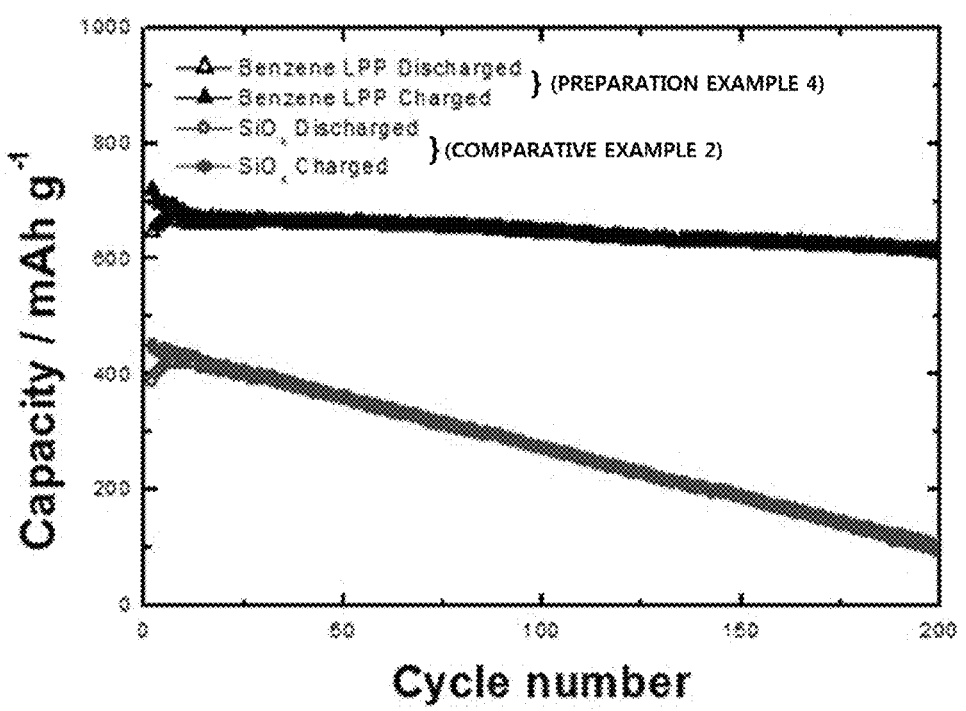
FIG. 14 is a graph showing a change in charge/discharge capacities according to the number of cycles of lithium secondary batteries according to Preparation Example 4 and Comparative Example 2.

FIG. 14 is a graph showing a change in charge/discharge capacity according to the number of cycles of the lithium secondary batteries according to Preparation Example 4 and Comparative Example 2. Charging was performed in constant current charge to 1.5 V at 100 mAh/g, discharging was performed in constant current discharge to 0.01 V at the same rate as the charge rate, and total 200 cycles were performed.

Referring to FIG. 14, in the case of the lithium secondary battery according to Comparative Example 2, that is, the lithium secondary battery using the silicon oxide according to Comparative Example 1 as a negative electrode active material, the charge capacity at the second cycle is 449 mAh/g, and the charge capacity at the two hundredth cycle is 95 mAh/g, and thus it can be seen that a capacity retention ratio is approximately 21%. Meanwhile, in the case of the lithium secondary battery according to Preparation Example 4, that is, the lithium secondary battery using the silicon oxide-carbon composite according to Preparation Example 3 as a negative electrode active material, the charge capacity at the second cycle is 721 mAh/g, and the charge capacity at the two hundredth cycle is 605 mAh/g, and thus it can be seen that a capacity retention ratio is approximately 84%.

Likewise, compared to when the silicon oxide is used as a negative electrode active material, when the silicon oxide-carbon composite is used as a negative electrode active material, it can be seen that the capacity retention ratio of the lithium secondary battery is greatly increased to approximately 400%.

Meanwhile, in the case of the lithium secondary battery according to Preparation Example 5, that is, the battery manufactured by the same method as described in Preparation Example 4 to reduce a thickness of a negative electrode to 50 μm, the charge capacity at the second cycle is approximately 1000 mAh/g, and the charge capacity was maintained at almost the same level at the twentieth cycle.

While the invention has been shown and described with reference to certain embodiments thereof, it will be understood by those skilled in the art that various changes in form and details may be made therein without departing from the scope of the invention as defined by the appended claims.

What is claimed is:

1. A silicon oxide-carbon composite, comprising:
   a matrix comprising amorphous silicon oxide and amorphous carbon that are randomly dispersed and mixed together in the matrix;
   silicon metal crystals dispersed in the matrix; and
   carbon structures dispersed in the matrix, the carbon structures comprising a laminar graphite crystal structure.

2. The composite according to claim 1, wherein the amorphous silicon oxide is $SiO_x$ (1<x<2).

3. The composite according to claim 1, wherein the contents of the amorphous carbon and the crystalline carbon structures are 60 to 90 wt. %.

4. The composite according to claim 1, wherein, in a graph obtained by X-ray photoelectron spectroscopy for the silicon oxide-carbon composite, a combined intensity of a peak representing an Si—O—C bond and a peak representing an Si—C bond is higher than that of a peak representing an $SiO_2$ bond.

5. The composite according to claim 1, wherein the carbon structures have a linear or curved laminar graphite crystal structure.

6. The composite according to claim 1, wherein the carbon structures have pores therein.

7. The composite according to claim 1, which is a random-shaped particle.

8. An energy storage device comprising:
   a first electrode including the silicon oxide-carbon composite according to claim 1;
   a second electrode; and
   an electrolyte disposed between the first electrode and the second electrode.

* * * * *